Dec. 28, 1965 A. I. DUMEY 3,226,693

INFORMATION REVERSING METHOD AND APPARATUS

Filed May 10, 1962 8 Sheets-Sheet 1

INVENTOR.
ARNOLD I. DUMEY

BY Griffin and Stokes
ATTORNEYS

Dec. 28, 1965 A. I. DUMEY 3,226,693

INFORMATION REVERSING METHOD AND APPARATUS

Filed May 10, 1962 8 Sheets-Sheet 2

INFORMATION REVERSING METHOD AND APPARATUS

Filed May 10, 1962

Dec. 28, 1965 A. I. DUMEY 3,226,693

INFORMATION REVERSING METHOD AND APPARATUS

Filed May 10, 1962 8 Sheets-Sheet 4

Dec. 28, 1965 A. I. DUMEY 3,226,693

INFORMATION REVERSING METHOD AND APPARATUS

Filed May 10, 1962 8 Sheets-Sheet 6

United States Patent Office 3,226,693

Patented Dec. 28, 1965

3,226,693
INFORMATION REVERSING METHOD AND APPARATUS

Arnold I. Dumey, Roslyn Heights, N.Y., assignor to Sperry Rand Corporation, New York, N.Y., a corporation of Delaware Filed May 10, 1962, Ser. No. 194,220
18 Claims. (Cl. 340—172.5)

This invention relates to a method and means for reversing the order of occurrence of a sequence of data signals manifested by electrical pulses. More particularly the present invention provides a method and means whereby a first series of data pulses are selectively applied to a plurality of delay elements to produce a second series of data pulses, the order of occurrence of data pulses in said second series being the reverse of the order of occurrence of data pulses in said first series.

The present invention finds particular use in data processing systems utilizing tapes as a storage medium. When used with these systems the present invention permits the tapes to be read either forwardly or backwardly and the information introduced into the central processor as if the tapes are always read in the forward direction.

A primary object of the present invention is to provide a simple and economical method and means for reversing a block of data pulses comprising M groups of N pulses each. In some embodiments hereinafter disclosed this is accomplished by first reversing the order of the pulses within each group and then reversing the order of the groups. In other embodiments this is accomplished by first reversing the order of occurrence of each group of pulses and then reversing the order of occurrence of pulses within each group. In a further embodiment this is accomplished by dividing each block of signals into groups and subgroups. Reversal is then accomplished by reversing the order of signals in each sub-group, reversing the order of sub-groups in each group, and then reversing the order of the groups in each block.

An object of the present invention is to provide a method and means for reversing the order of occurrence of the pulses in each block of a sequence of JMN pulses in $(J+1)MN-1$ pulse periods. Since it normally requires JMN pulse periods for a sequence of JMN pulses to pass a given point in a circuit it is seen that the total delay introduced by one embodiment of the present invention in accomplishing block-wise reversal of JMN pulses is only $MN-1$ pulse periods.

An object of the present invention is to provide a method and means for reversing and reading out the blocks of data represented by a sequence of JMN pulses in $(J+1)MN-1$ pulse periods by reversing the order of occurrence of the pulses in each group and subsequently reversing the order of occurrence of said groups in said blocks.

An object of the present invention is to provide a method and means for reversing and reading out the blocks of data represented by a sequence of JMN pulses in $(J+1)MN-1$ pulse periods by reversing the order of occurrence of the groups in said blocks and subsequently reversing the order of occurrence of the pulses in said groups.

A further object of the present invention is to provide means for reversing the order of occurrence of pulses in a block of MPQ pulses, said means requiring only $3/2(MPQ)+1$ elements of delay. This embodiment reverses blocks of MPQ pulses where Q is the number of pulses in each sub-group, P is the number of sub-groups, and M is the number of groups. The reversal operation is accomplished in $2MPQ+2$ pulse periods by reversing the order of the pulses in each sub-group, reversing the order of the sub-groups and then reversing the order of the groups.

A further object of the invention is to provide a method and means for reversing the order of occurrence of data signals in a block of MPQ signals by reversing the order of occurrence of signals in the sub-group, reversing the order of occurrence of sub-groups of signals within the groups and reversing the order of occurrence of groups of signals within the block. In this embodiment an individual data signal is subjected to delays of $2(Q-q)+1$, $2Q(P-p)+1$ and $2PQ(M-m)+1$ where Q is the number of data signals in a sub-group, P is the number of subgroups in a group, M is the number of groups in the block being reversed and $q$, $p$ and $m$ represent the relative order of occurrence of a pulse with its sub-group, the relative order of occurrence of a sub-group within its group, and the relative order of a group within its block, respectively. In this embodiment the total time required to reverse a sequence of J blocks on a block basis is $(J+1)MPQ+2$ bit intervals.

Other objects of the invention and its mode of operation will become apparent upon consideration of the following description and the accompanying drawings in which.

Figures 8A, 8B:
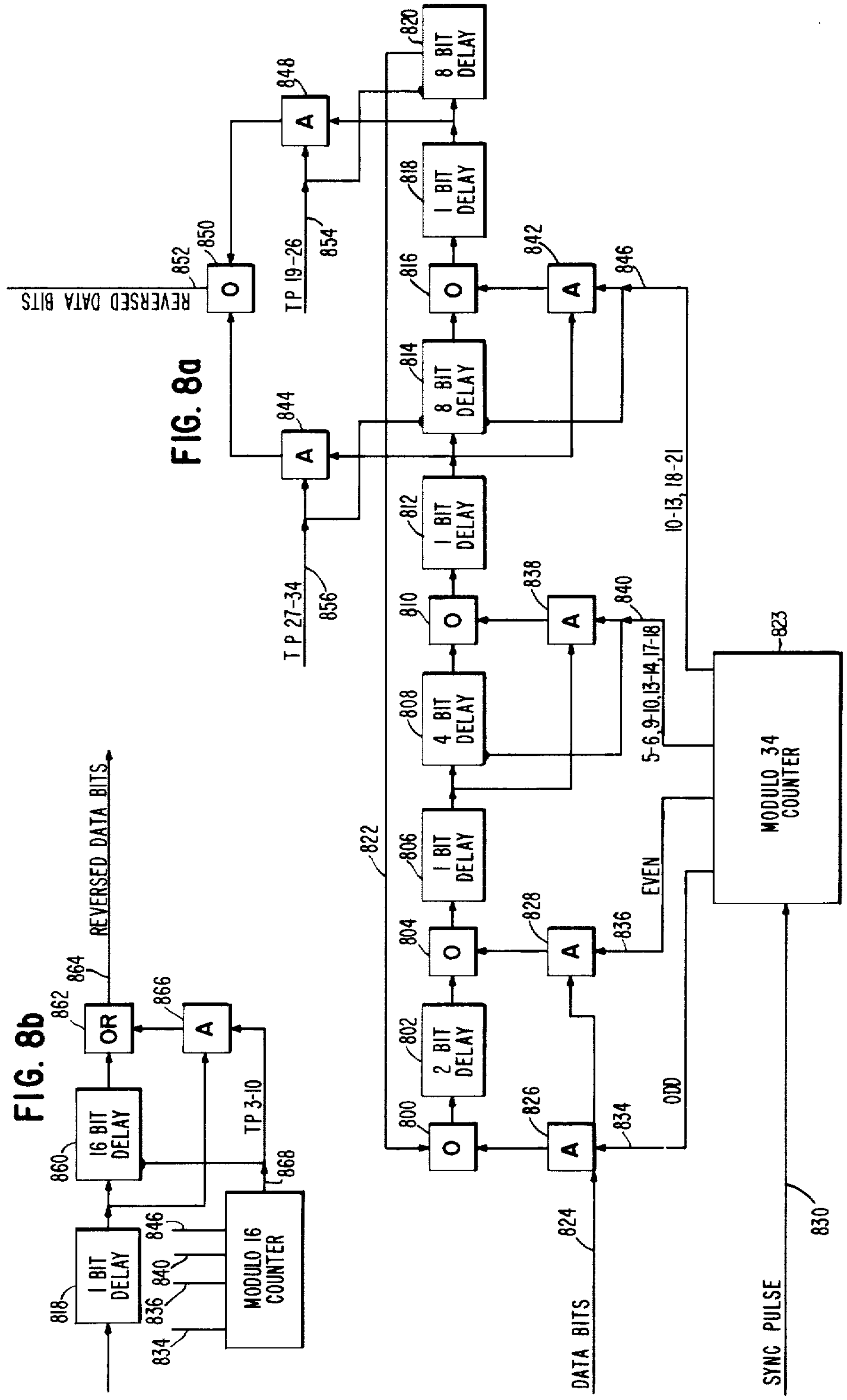

FIGURE 8*a* shows an embodiment wherein multiple factors and feedback are utilized to reverse the order of bits in a block;

FIGURE 8*b* is a modification of FIGURE 8; and

Figure 9:
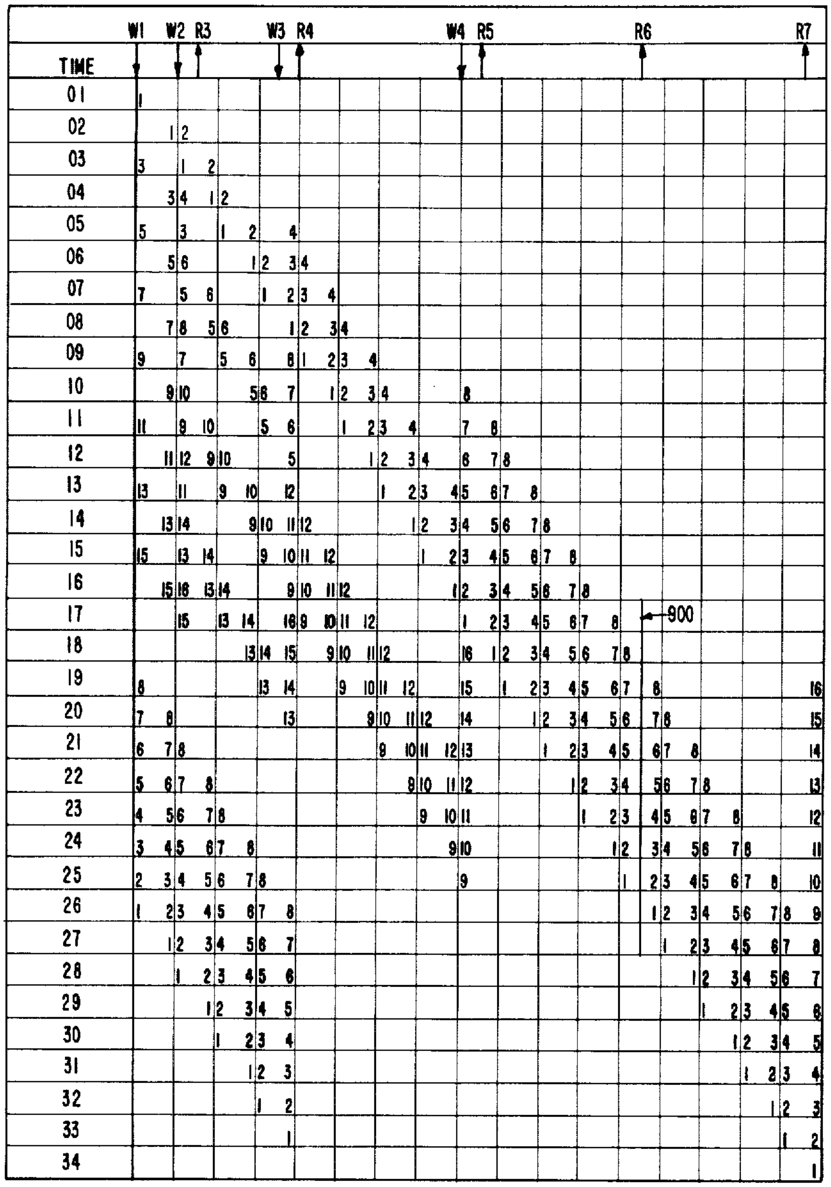

FIGURE 9 is a timing chart illustrating the sequence of operation of the devices shown in FIGURES 8 and 8*a*.

Figure 1:
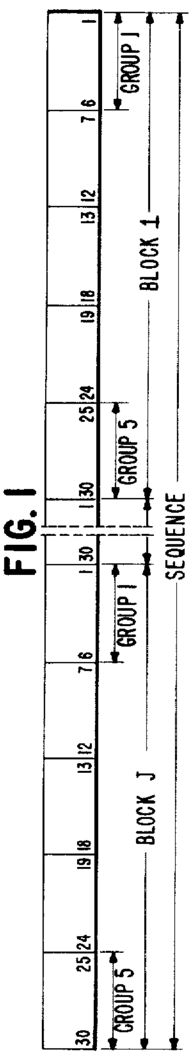
FIGURE 1 illustrates the format of a sequence of binary pulses or bits of information divided into J blocks, each block having $M=5$ groups and each group having $N=6$ bits.
Figure 2:
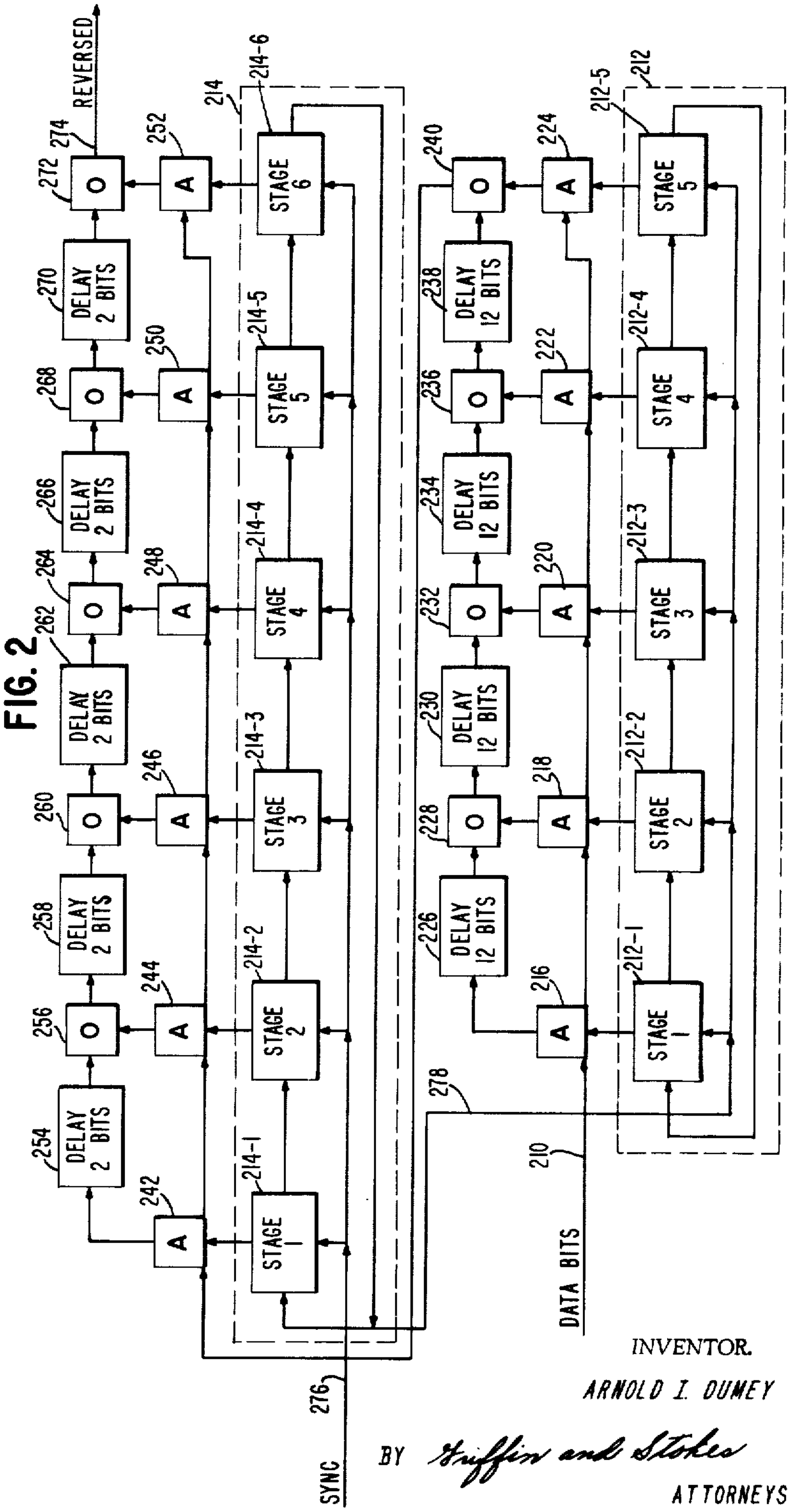
FIGURE 2 shows a first embodiment of the invention adapted to reverse the order of bits in each block illustrated in FIGURE 1.

FIGURE 1 illustrates a format of a sequence of data bits, blocks of which may be reversed by the apparatus shown in FIGURE 2. The sequence includes one or more blocks of thirty binary bits each. Each block is divided into five groups with each group containing six bits.

The sequence of pulses or data bits is applied to FIGURE 2 over lead 210 beginning with bit 1 in group 1 of block 1. One bit is applied to the input lead during each bit interval so that the thirtieth bit of block J is applied to lead 210 during the 130*th* bit interval.

Referring now to FIGURE 2, the reversal apparatus shown therein is adapted to reverse blocks of data bits by first reversing the order of the groups within a block and then reversing the order of the bits within each group. It includes a modulo-5 counter 212 and a modulo-6 counter 214. The output from each stage of counter 212 is connected to an individual one of a plurality of AND gates 216, 218, 220, 222 and 224. The input lead 210 is connected to a second input of each of these gates.

The output of AND 216 is connected to a delay element 226 capable of delaying signals applied thereto for twelve bit intervals. The output of delay element 226 is connected to an OR circuit 228 the output of which is connected to a twelve bit delay element 230. The output of AND 218 is also connected to OR 228 so that delay element 230 receives output signals from AND 218 and delay element 226.

In like manner, OR 232 receives signals from AND 220 and delay element 230 and applies them to delay element 234. OR 236 receives signals from AND 222 and delay element 234 and applies them to delay element 238. OR 240 receives signals from AND 224 and delay element 238 and applies them to one input of each of a plurality of AND gates 242, 244, 246, 248, 250 and 252. Each of these gates is also connected to an output from one stage of counter 214.

The output of AND 242 is connected to a delay element 254 capable of delaying signals applied thereto for two bit intervals. The output of delay element 254 is connected to an OR circuit 256 the output of which is connected to a two-bit delay element 258. The output of AND 244 is also connected to OR 256 so that delay element 230 receives output signals from AND 244 and delay element 254 and applies them to delay element 258.

OR circuits 260, 264 and 268 have inputs connected to AND 246 and delay element 258, AND 248 and delay element 262, and AND 250 and delay element 266, respectively. The output signals from OR circuits 260, 264 and 268 are applied to delay elements 262, 266 and 270, respectively.

OR circuit 272 is connected to the output terminals of AND 252 and delay element 270. The data bits of a block of data appear serially in time at the output of OR 272 with the last bit applied to lead 210 appearing first and the first bit applied to lead 210 appearing last.

The counters 212 and 214 may be ring counters of conventional design. When a given stage is on it conditions the AND gate connected to its output. A stage is turned off in response to the termination of the sync pulse and produces a signal to turn on the next stage. The sync or clock pulses are applied simultaneously to each stage of counter 214 over the lead 276 with one sync pulse occurring during each bit interval.

The output from stage 214–6 is connected by way of lead 278 to each stage of counter 212 to provide the sync pulses for this counter. Since stage 214–6 is turned off only after every sixth sync pulse on lead 276 and the sync pulses occur in synchronism with the data bits it is obvious that counter 212 is advanced one stage after every six binary bits are received on lead 210.

FIGURE 3 is a timing diagram for visually illustrating the operation of the apparatus shown in FIGURE 2. The timing diagram has sixty horizontal lines each line showing the lcation of each bit of data at the end of that time interval. The vertical columns each represent a one bit storage element. Between points W1 and W2 are twelve vertical columns representing the twelve-bit delay element 226. The twelve vertical columns between W2 and W3, W3 and W4, and W4 and W5 represent the twelve-bit delay elements 230, 234 and 238, respectively.

There are two vertical columns between W5 and W6, W6 and W7, W7 and W8, W8 and W9 and W9 and R10. These columns represent the two-bit delay elements 254, 258, 262, 266 and 270, respectively. Therefore, to determine the location of each bit at a particular time merely locate the particular time interval in the left-most column of FIGURE 3 and read the horiontal line of numbers to its right.

At time 01 the first bit of data of block 1 appears on lead 210 and conditions one input of each of the AND gates 216, 218, 220, 222 and 224. At the start of the reversal operation stage 1 of both counters is on thus data bit 1 passes through AND 216 and is stored in delay element 226. Conventional means (not shown) are provided to reset the counters before the first bit of a data transmission is received. The sync pulse on lead 276 turns on stage 214–2. The counter 212 is not advanced.

During time 02 the second bit of data of block 1 appears on lead 210. Since stage 212–1 is still on this bit also passes through AND 216 and is stored in delay element 226. In the meantime, bit 1 has advanced along the delay element 226 and occupies the second bit storage position therein. Again the sync pulse on lead 276 advances counter 214 with counter 212 remaining unchanged.

During time intervals 03, 04, 05 and 06 bits 3, 4, 5 and 6 of block 1 appear on lead 210, pass through AND 216, and are stored in delay element 226. At the end of time 06 the first six data bits are stored in the first six storage locations of delay element 226.

When the sync pulse on lead 276 terminates at the end of time 06 stage 214–6 produces a signal to turn on stage 214–1. This signal also passes over lead 278 to counter 212 where it turns on stage 2. The seventh bit of block 1 appears on lead 210 during time 07 and since stage 212–2 is on the seventh bit passes through AND 218 and OR 228 and is stored in delay element 230. During this time the six bits stored in delay element 226 have advanced one storage position and occupy storage positions 2 through 7.

During the next five time intervals bits 8, 9, 10, 11 and 12 pass through AND 218 and are stored in delay element 230 with bits 1 through 6 being advanced five positions in delay element 226.

When the sync pulse on lead 276 terminates at the end of time 12 stage 6 again produces a pulse to turn on stage 214–1 and advance counter 212. This turns on stage 212–3 and conditions AND 220 so that bits 13 through 18 pass through AND 220 and OR 232 and are stored in delay element 234.

Figure 3A:
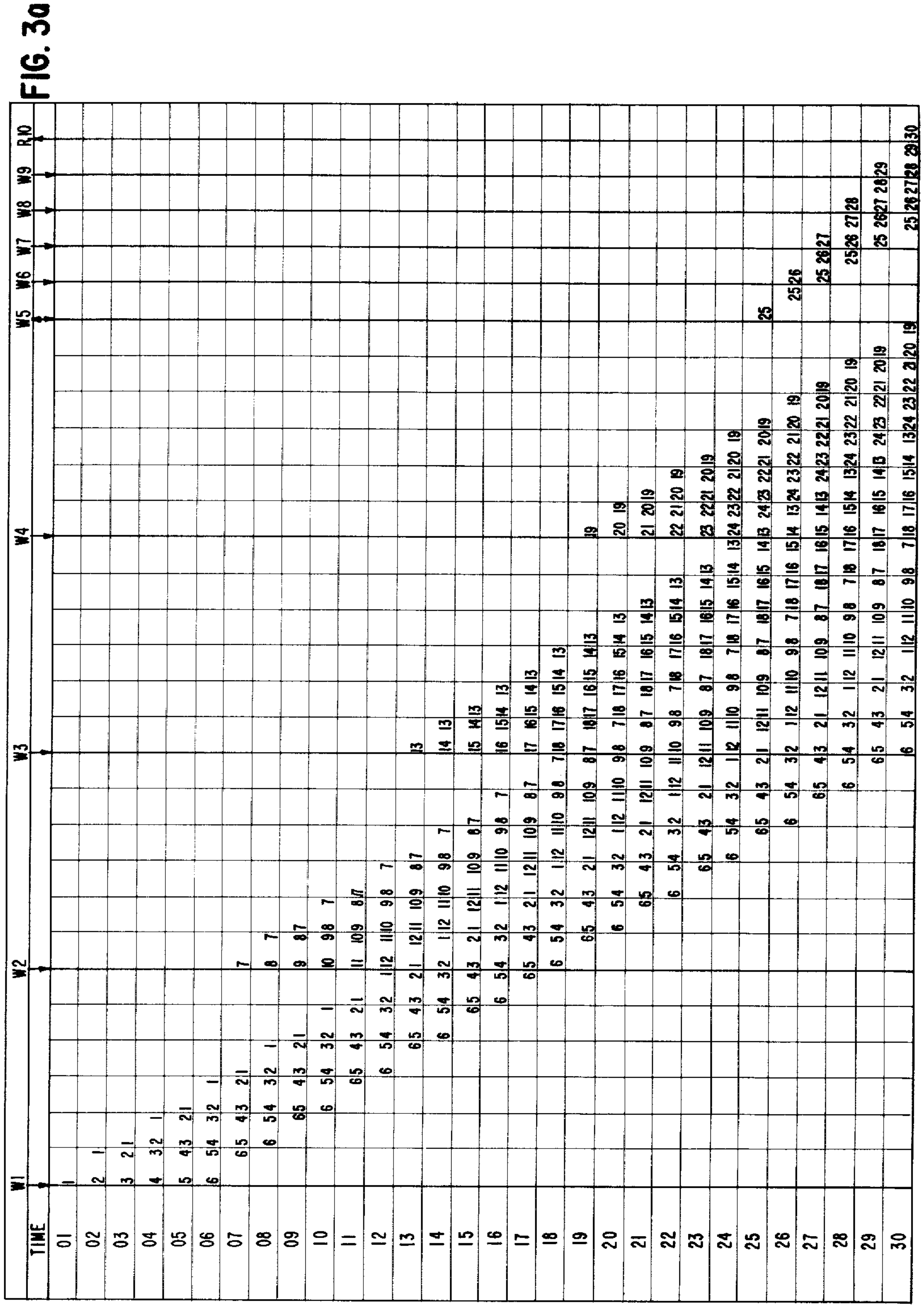
FIGURE 3 is a timing chart illustrating the operation of the first embodiment.

It should be noted that data bit 1 entered into twelve-bit delay element 226 at time 01 has advanced through the delay element and at time 12 occupies the last storage position therein. Therefore, during time 13 bit 1 emerges from delay element 226, passes through OR 228, and is stored in the first storage position of delay element 230. As this takes place bit 12 moves from the first to the second storage position in element 230 leaving the first storage position free to receive bit 1. At the end of time 18 bits 6 through 1 are in the first six positions of element 230, bits 12 through 7 are in positions 7 through 12 of element 230 and bits 18 through 13 are in the first six positions of delay element 234. This is shown in FIGURE 3*a*.

At the end of time 18 stage 214–6 again produces a pulse to turn on stage 214–1 and advance counter 212. This turns on stage 212–4 to condition AND 222. During times 19 through 24 bits 19 through 24 appear on lead 210, pass through AND 222 and OR 236 and are stored in delay element 238. As shown in FIGURE 3 this completes the reversal of the first four groups of bits with group 1 (bits 1–6) being stored in the last six positions of delay 230, group 2 (bits 7–12) being stored in the first six positions of delay 234, group 3 (bits 13–18) being stored in the last six positions of delay 234, and group 4 (bits 19–24) being stored in the first six positions of delay 238.

At the end of time 24 stage 214–6 turns on stage 214–1 and advances counter 212 so that 212–5 conditions AND 224.

Bit 25 of block 1 appears on lead 210 during time 25. It passes through AND 224, OR 240 and AND 242 and is stored in the first storage position of the two-bit delay element 254.

At the end of time 25 a sync pulse advances counter 214 to turn on stage 214–2. Bit 26 then passes from lead 210 through AND 224, OR 240, AND 244, and OR 256 and is stored in the first position of delay element 258.

At the end of time 26 a sync pulse again advances counter 214 to turn on stage 214–3. During time 27 bit 27 passes through AND 224, OR 240, AND 246, and OR 260 and is stored in the first storage position of delay element 262. During this same time period bit 26 advances to the second storage position of delay element 258 and bit 25 emerges from delay element 254, passes through OR 256 and is stored in the first storage position of delay element 258.

During time 28 stage 214–4 is on so bit 28 passes through AND 224, OR 240, AND 248, and OR 264 and is stored in delay element 266. Dnring time 29 stage 214–5 is on so bit 29 passes through AND 224, OR 240, AND 250, and OR 268 and is stored in delay element 270.

At the end of time 29 stage 214–6 is turned on to condition AND 252. During time 30 bit 30 of block 1 appears on lead 210 and passes through AND 224, OR 240, AND 252, and OR 272 to the output line 274. Thus, the last bit of block 1 applied to input lead 210 is the first bit to appear on output lead 274.

At the end of time 30 the sync pulse causes both counters to advance because stage 214–6 is on. This turns on stages 212–1 and 214–1.

During time 31 several operations take place. Bit 29, entered into delay element 270 at time 29, emerges from the delay element, passes through OR 272 and appears on output lead 274. Second, bit 19 entered into delay element 238 at time 19 emerges from the delay element, passes through OR 240 and AND 242 and is stored in delay element 254. Finally, bit 1 of block 2 appears on lead 210, passes through AND 216, and is stored in delay element 226.

During times 32 through 35 bits 28 through 25 emerge from delay element 270 and appear on output lead 274. During times 32 through 36 bits 20 through 24 are applied to delay elements 254, 262, 266 and 270 and output line 274, respectively. Bits 2 through 6 of the second block are stored in delay element 226.

The operation of FIGURE 2 between times 36 and 60 is obvious from the timing chart and the above description. It should be noted however that bit 1 of block 1 which is the first bit applied to lead 210 appears on output lead 274 during time 59. Thus, the apparatus of FIGURE 2 requires 59 bit intervals to reverse one block of thirty bits. For the general case the time required to reverse a single block of MN bits is $2MN-1$ bit intervals where M is the number of groups in a block and N is the number of bits in a group.

Furthermore, the reversal of groups in the second and succeeding blocks takes place while the bits in each group of the preceding block are being reversed so that the last bit (before reversal) of each block appears on the output lead in the bit interval following that in which the first bit (before reversal) of the preceding block appears. This is evident from FIGURE 3 where bit 1 of block 1 appears at the output during time 59 and bit 30 of block 2 appears at the output during time 60. Thus for the general case it requires $(J+1)MN-1$ bit intervals to reverse and read out a sequence of JMN bits where J is the number of blocks in the sequence. Since it normally requires JMN bit intervals for a sequence of JMN bits to pass a given point in a circuit the additional delay caused by reversing the sequence is only $$[(J+1)MN-1]-JMN=MN-1$$

bit intervals. The additional delay is only $MN-1$ bit intervals regardless of the number of blocks in the sequence.

While FIGURE 2 shows a specific embodiment suitable for use where $M=5$, and $N=6$, it will be obvious to those skilled in the art that if it is desired to reverse blocks each having thirty bits M may be 6 and N may be 5. Other values of M and N may be used to reverse blocks of thirty digits provided $MN=30$. Furthermore, the present invention is not limited to the reversal of blocks where $MN=30$. For example, to reverse blocks of twenty-eight bits each M may be 4 and N may be 7.

Usually, the counter 212 is provided with M stages and the counter 214 is provided with N stages. The apparatus must have $M+N$ AND gates, $M+N-2$ OR circuits, $M-1$ delay elements each having a delay of two N bits, and $N-1$ delay elements each having a delay of two bits. The delay elements may be electronic tube, transistor or magnetic core shift registers. Alternatively, they may be dynamic delays such as electro-acoustical delay lines or magnetic drums.

The reversal operation described above is accomplished by selectively delaying each group of bits $2N(M-m)$ bit intervals in elements 226, 230, 234 and 238 where $m$ is the relative order of occurrence of a group in the block and then delaying the bits in each group by $2(N-n)$ bit intervals in elements 254, 258, 262, 266 and 270 where $n$ represents the relative order of occurrence of a bit in its group.

As will be shown subsequently, the reversal may be accomplished by treating the incoming block of data bits as though it were divided into M groups each having P sub-groups with each sub-group containing Q bits.

Furthermore, the invention is not limited to two or three reversal groups but may be employed in devices having four or more reversal groups. In this case three reversal mechanisms are provided having means for reversing groups, sub-groups and bits. The group reversal apparatus may comprise $M-1$ delay elements each having a delay of 2PQ bit intervals and serially connected to provide a delay of $2PQ(M-1)$ bit intervals. The sub-group reversal apparatus may comprise $P-1$ delay elements each having a delay of 2Q bit intervals and serially connected to provide a delay of $2Q(P-1)$ bit intervals. The bit reversal apparatus may comprise $Q-1$ delay elements each having a two-bit delay and serially connected to provide a delay of $2(Q-1)$. Each apparatus may be similar to the group and bit reversal apparatus of FIGURE 2. In fact, FIGURE 2 is the specialized case where $M=5$, $P=1$ and $Q=6$.

Figure 4:
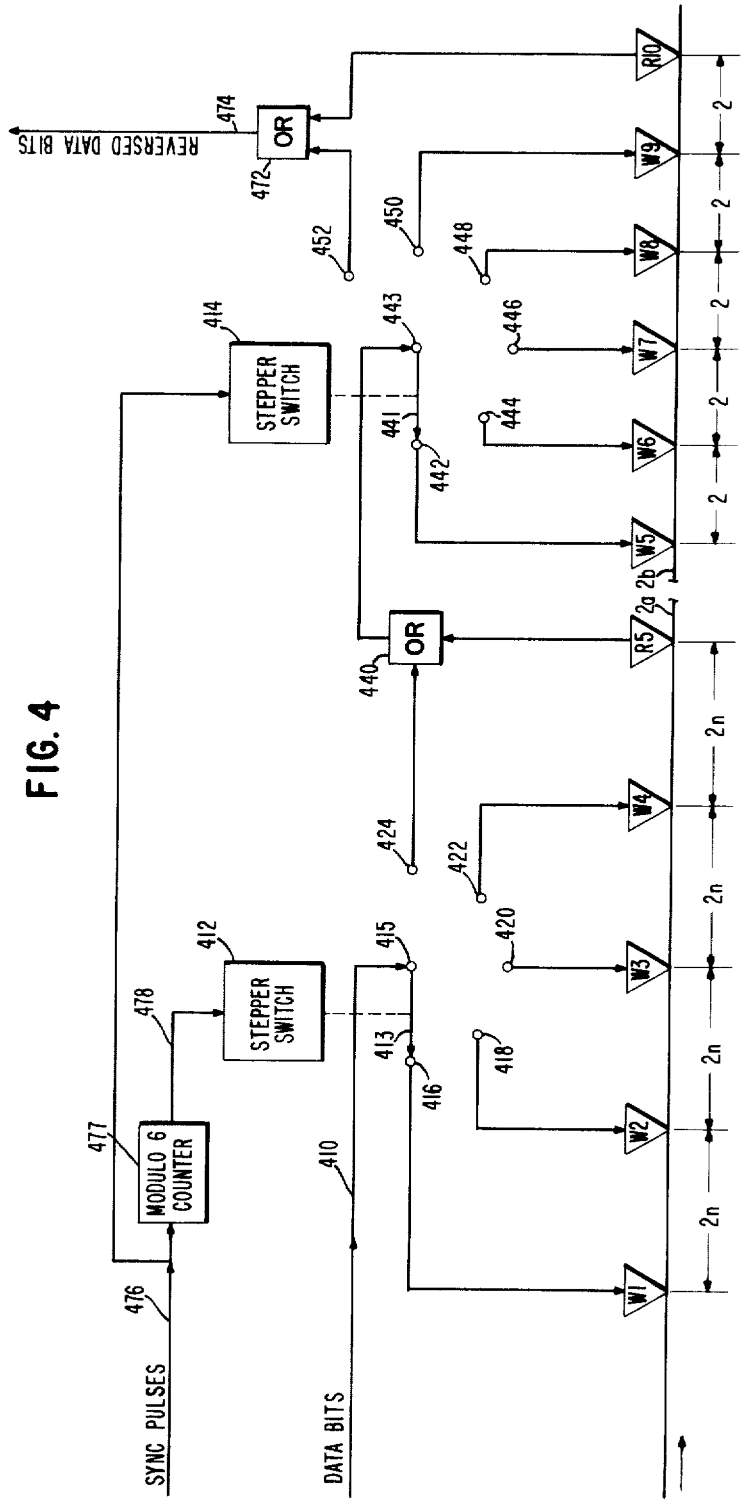
FIGURE 4 shows an apparatus similar to that of FIGURE 2 adapted to utilize the surface of a rotating magnetic drum as the delay element.

FIGURE 4 shows a modification of the circuit of FIGURE 2 wherein the delays required for bit and group reversals are provided by the surface of a magnetic drum.

This modification comprises a group reversal apparatus and a bit reversal apparatus. The group reversal mechanism comprises a stepper switch 412 having a contact arm 413 connected to an input terminal 415 and adapted to successively make contact with a plurality of output terminals 416, 418, 420, 422 and 424. The output terminals are connected to write heads W1, W2, W3 and W4 and an OR circuit 440, respectively. A read/erase head R5 reads signals from the drum surface $2a$ and applies them to a second input of OR circuit 440.

The output of OR 440 is applied to input terminal 441 of the bit reversal apparatus. The bit reversal apparatus comprises a stepper switch 414 having a contact arm 441 connected to an input terminal 243 and adapted to successively make contact with a plurality of output terminals 442, 444, 446, 448, 450 and 452. The output terminals are connected to write heads W5, W6, W7, W8 and W9 and an OR circuit 472. A read/erase head R10 reads signals from the drum surface $2b$ and applies them to a second input of OR 472. Each block of data bits applied to input lead 410 subsequently appears in reverse order on output lead 474 which is the output of OR circuit 472.

The stepper switches are preferably provided with a reset circuit of conventional design so that they may be reset before data transmission begins.

A sync pulse appears on lead 476 during each bit interval. This signal is applied to stepper switch 414 to advance the switch one position each bit interval. The sync pulses are also applied to a modulo-6 counter which has an output lead 478 connected to stepper switch 412.

The apparatus reverses the sequence of groups in a block of five groups each containing six bits and then reverses the sequence of bits in each group. This is accomplished by delaying each group of bits $2N(M-m)$ bit intervals where $m$ is the relative order of occurrence of a group within a block and then delaying each bit $2(N-n)$ bit intervals where $n$ is the relative order of occurrence of the bit within its group. The distances between heads W1 and W2, W2 and W3, W3 and W4, and W4 and W5 are chosen such that the time it takes a signal on the drum surface to move from one head to the next is 2N bit intervals where N is the number of bits in a group. Since $N=6$ this delay is chosen as twelve-bit intervals. Thus, the distances between these heads serve the same purpose as the delays 226, 230, 234 and 238 of the previous embodiment.

The heads W5, W6, W7, W8, W9 and R10 are positioned such that a signal passing under one head during a given bit interval passes under the next succeeding head two bit intervals later. Thus the distance between these heads serves the same purpose as the delays 254, 258, 262, 266 and 270.

The drum surfaces 2*a* and 2*b* may be portions of the same recording track on a rotating magnetic drum or they may comprise portions of two separate recording tracks. The heads R5 and R10 erase signals from the drum surface as they read the signals. Alternatively, R5 and R10 may be read heads only with separate write heads being provided after heads R5 and R10 in the direction of travel of the magnetic surface.

Figure 3B:
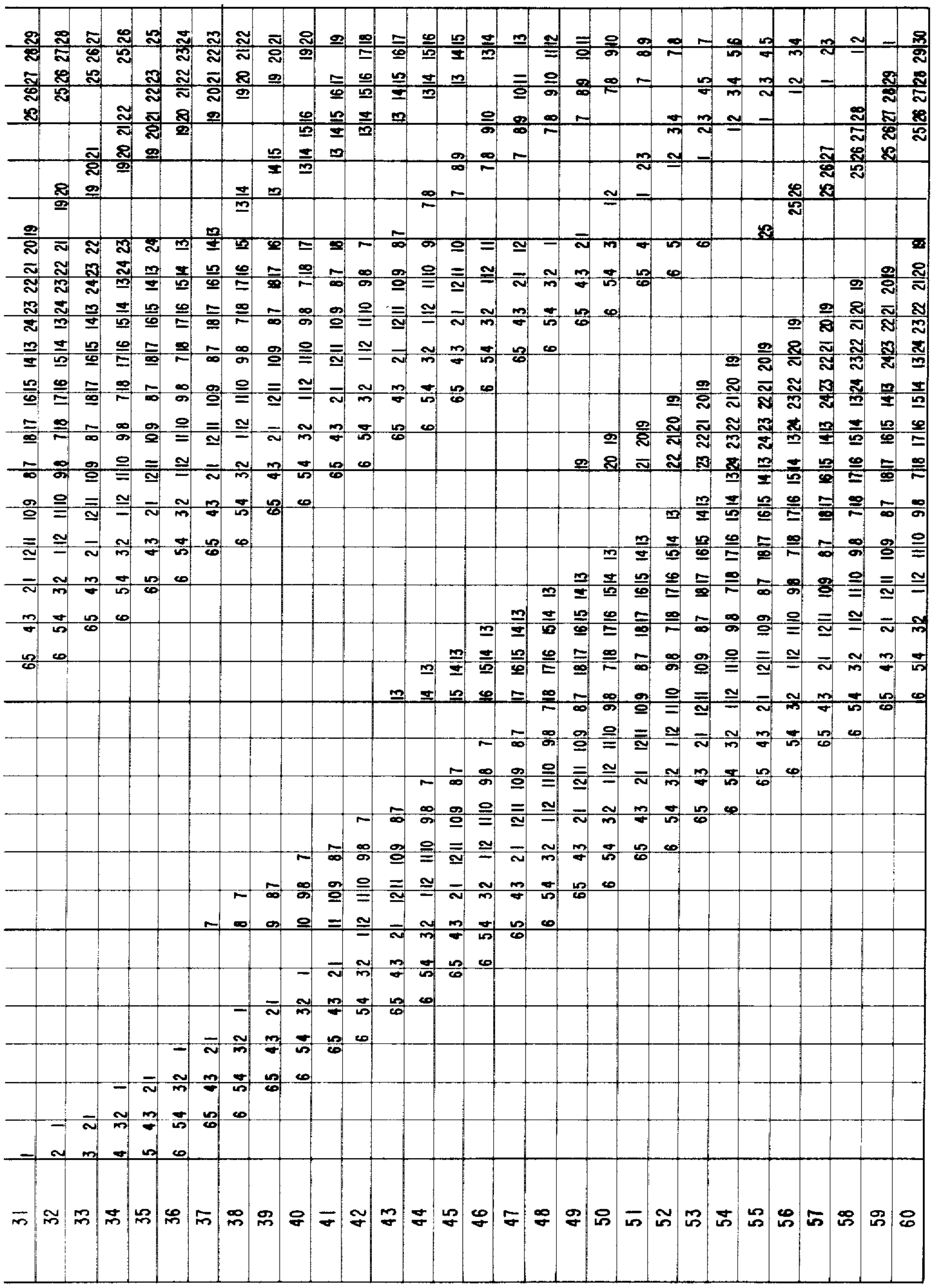

The circuit of FIGURE 4 performs the group and bit reversals in the same sequence as the circuit of FIGURE 2 hence the timing chart of FIGURES 3*a* and 3*b* illustrates its operation.

During bit intervals 1 through 6 data bits 1 through 6 appear on lead 410. These bits are applied to terminal 415 and pass over contact arm 413 and terminal 416 and are recorded on surface 2*a* by head W1. At the end of the sixth time, interval counter 477 produces an end carry signal which advances stepper switch 412 so that contact arm 413 connects terminal 415 to 418.

During times 7 through 12 data bits 7 through 12 appear on lead 410, pass over contact arm 413 and terminal 418 and are recorded on the drum surface by head W2. Reference to FIGURE 3 shows that at the end of time 12 the second group comprising bits 7 through 12 has been recorded on the drum immediately ahead of the bits 1 through 6 of group 1.

At the end of time 12 the counter 477 again produces an end carry pulse to advance stepper switch 412. Therefore, during times 13 through 18 bits 13 through 18 are recorded on the drum surface by head W3. FIGURE 3 shows that at the end of time 18 the bits of groups 1 and 2 lie on that portion of drum surface between heads W2 and W3 while the six bits of group 3 occupy the first six recording positions to the right of head W3.

At the end of time 18 counter 477 again produces an end carry pulse to advance stepper switch 412. During times 19 through 24 bits 19 through 24 are recorded on the drum by head W4.

At the end of time 24 stepper switch 412 is again advanced by an end carry pulse from counter 477. This connects terminal 415 to terminal 424. Stepper switch 414 initially starts out with terminal 443 connected to terminal 442 by arm 441. The arm advances one step at the end of each bit interval so at the end of time 24 it is again advanced to make contact with the output terminal 442.

During time 25 bit 25 appears on lead 410 and is recorded on the drum surface by head W5. The circuit is from lead 410, terminal 415, arm 413, terminal 424, OR 440, terminal 443, arm 441 and terminal 442 to head W5.

At the end of time 29 stepper switch 414 is advanced so that during time 26 bit 26 is recorded by head W6. This places bit 26 ahead of bit 25 in a sequence of signals on the drum.

Since stepper switch 414 is advanced at the end of each bit interval bits 27, 28 and 29 are recorded by heads W7, W8, and W9, respectively, during bit intervals 27, 28 and 29.

At the end of time 29 stepper switch 414 is advanced to terminal 452. During time 30 bit 30 is applied to lead 410 and appears on output lead 474. The circuit is through terminal 415, arm 413, terminal 424, OR 440, terminal 443, arm 441, terminal 452 and OR 472.

At the end of time 30 both stepper switches are advanced. Stepper switch 412 again connects lead 410 to head W1 so that the bits of the first group of the next block to be reversed may be recorded on the drum surface.

Stepper switch 414 connects the output of OR 440 to head W5 so that head W5 may record the information read by head R5. Bit 19 was recorded by head W4 during time 19. It is moved along the distance between W4 and W5 and is read by R5 during time 31 and recorded by head W5.

Bit 29 appears on output lead 474 during time 31. This bit was recorded by head W9 at time 29 and during the intervening bit interval moved to R10. Therefore, bit 29 is read out by R10 during time 31 and is applied to the output lead through OR 472.

From the preceding description the remainder of the reversing operation is easily understood by considering the timing chart of FIGURE 3. During each bit interval another bit of a block is read by R5 and recorded by the heads W5 through W9, provided the bit is not the last bit (before reversal) in a group. If a bit is the last bit of a group it is read by R5 and applied to the output lead through OR 472. During those bit intervals in which the bits of one group read by head R5 are recorded by one of the heads W5 through W9, head R10 reads one of the bits of the preceding group recorded by heads W5 through W9 and applies it to the output lead through OR 474.

As with the embodiment of FIGURE 2, the apparatus of FIGURE 4 requires $(J+1)MN-1$ bit intervals to reverse the order of the digits in a sequence of J blocks, said reversing operation causing an additional delay of only $MN-1$ bit intervals regardless of the number of blocks in which the bits are reversed.

Figure 5:
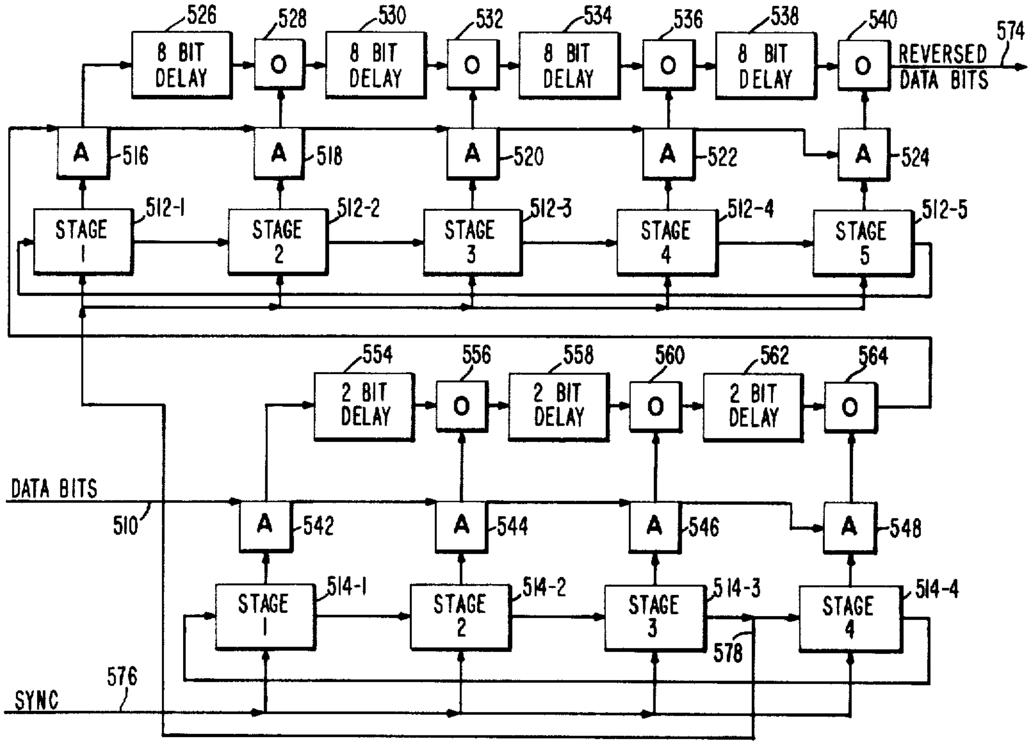
FIGURE 5 shows a second embodiment of the present invention adapted to reverse blocks of twenty binary bits where each block contains five groups each having four bits.

FIGURE 5 shows an embodiment of the invention adapted to reverse blocks containing twenty data bits by first reversing the order of the bits within a group and then reversing the order of the groups within a block.

The bit reversal apparatus comprises a counter 514 which is advanced one stage by each sync pulse appearing on lead 576, a plurality of AND gates 542, 544, 546 and 548, a plurality of two-bit delay elements 554, 558 and 562 and a plurality of OR circuits 556, 560 and 564. The counter has four stages each of which is connected to a corresponding one of the AND gates. Data bit input line 510 is connected in parallel to each of the AND gates. The outputs from AND gates 544, 546 and 548 are applied to one input of OR circuits 556, 560 and 564, respectively. AND 542 is connected to the input of delay element 554. The outputs of delay elements 554, 558 and 562 are connected to the input terminals of OR circuits 556, 560 and 564, respectively, while the outputs of OR circuits 556 and 560 are connected to the inputs of delay elements 558 and 562, respectively. The output of OR circuit 564 is applied to the block reversal apparatus.

The block reversal apparatus comprises a counter 512 which is advanced one stage by each pulse appearing on lead 578, a plurality of AND gates 516, 518, 520, 522 and 524, a plurality of 8-bit delay elements 526, 530, 534 and 538 and a plurality of circuits 528, 532, 536 and 540. The counter has five stages each of which is connected to a corresponding one of the AND gates. The output of OR circuit 564 is connected in parallel to each of the AND gates. The outputs from AND gates 518, 520, 522 and 524 are applied to one input of OR circuits 528, 532, 536 and 540, respectively. AND 516 is connected to the input of delay element 526. The outputs of delay elements 526, 530, 534 and 538 are connected to the input terminals of OR circuits 528, 532, 536 and 540, respectively, while the outputs of OR circuits 528, 532 and 536 are connected to the inputs of delay elements 530, 534 and 538, respectively. The reversed data bits appear on lead 574 at the output of OR 540.

Figure 6:
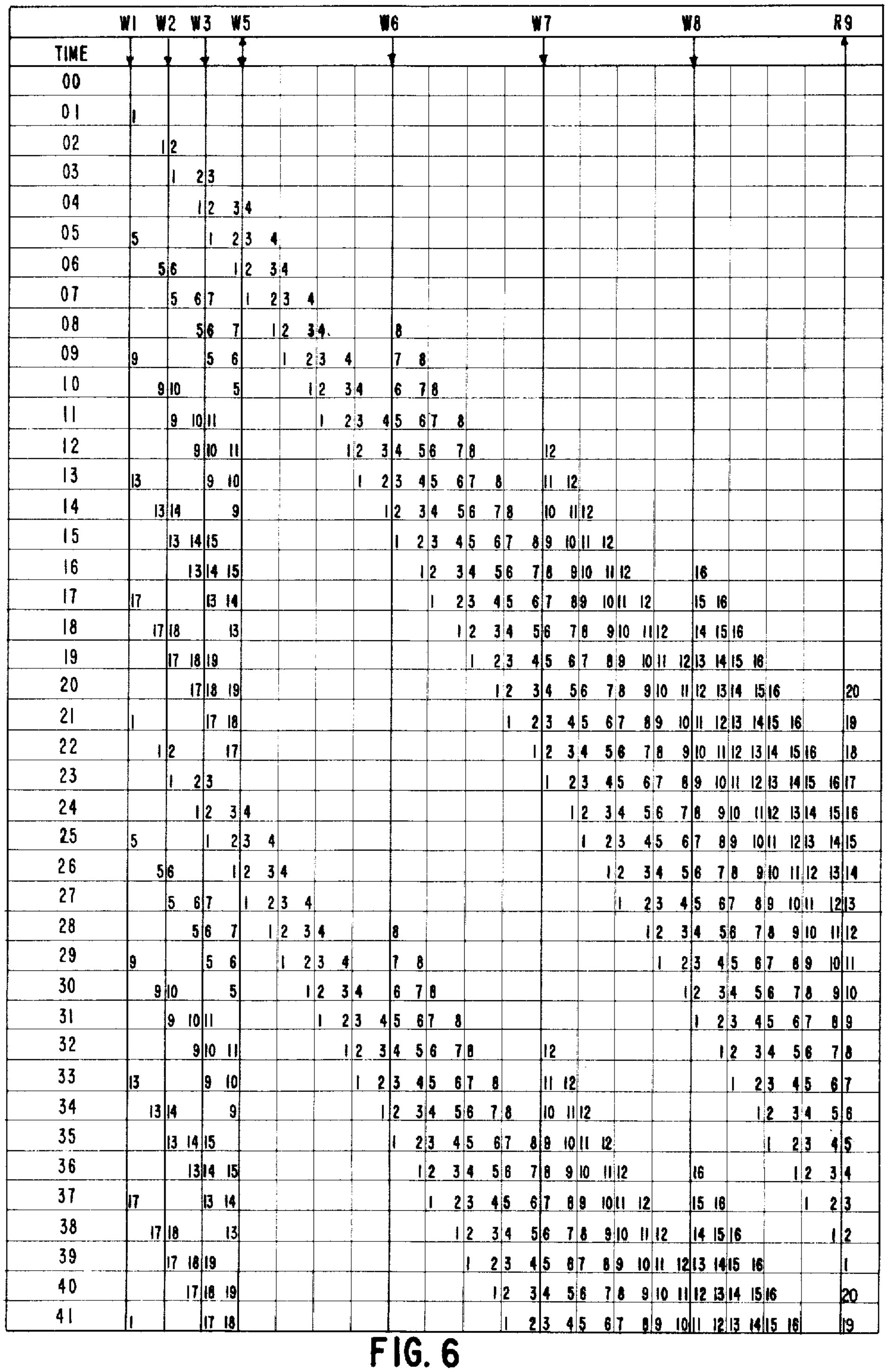
FIGURE 6 is a timing chart illustrating the operation of the second embodiment.

FIGURE 6 graphically illustrates the mode of operation of the circuit shown in FIGURE 5. At the top of FIGURE 6 the distance between points W1 and W2, W2 and W3, W3 and W5 represent the two-bit delays provided by elements 554, 558 and 562, respectively, while the distances between W5 and W6, W6 and W7, W7 and W8, and W8 and W9 represent the delays provided by delay elements 526, 530, 534 and 538, respectively.

The apparatus of FIGURE 5 is adapted to reverse the order of bits in blocks containing 20 bits. The apparatus treats a block as five groups each containing four bits.

Assume that both counters are reset and stages 512–5 and 514–1 are on. During time 01 data bit 1 appears on lead 510 and a sync pulse appears on lead 576. Bit 1 passes through AND 542 and is stored in delay element 554. When the sync pulse terminates stage 514–1 goes off and stage 514–2 is turned on.

During time 02 the second data bit appears on lead 510 and passes through AND 544 and OR 556 and is stored in delay element 558. When the sync pulse terminates stage 514–3 goes on and stage 514–2 goes off.

Bit 3 appears on lead 510 during time 03 and passes through AND 546 and OR 560 and is stored in delay element 562. During this time bit 1 emerges from delay element 554, passes through OR 556, and is stored in delay element 558. Bit 2 shifts from the first to the second storage position in 558 during this time. At the end of time 03 the sync pulse advances counter 514 to turn on stage 4. Also, when stage 514–3 goes off, it produces a sync pulse on lead 578 to turn on counter stage 512–1.

At time 04 bit 4 appears on lead 510, passes through AND 548 and OR 564 and is applied to the AND gates in the block reversal mechanism. Stage 512–1 is on so bit 04 passes through AND 516 and is stored in delay element 526. Reference to FIGURE 6 shows that at the end of time 04 bit 1 is in the last storage position of element 558, bits 2 and 3 are in the first and second storage positions of element 562 and bit 4 is in the first storage position of element 526. At the end of time 04 the sync pulse resets counter stage 514–4 thus producing an end carry signal to turn on stage 514–1.

During time 05 the fifth data bit is entered into delay element 554 through AND 542. At the same time bit 4 moves from the first to the second storage position in delay element 526, bit 3 enters the first storage position of element 526, bit 2 advances to the second storage position of delay element 562, and bit 1 moves from 558 into the first storage position of delay element 562.

During the sixth and seventh time intervals bits 6 and 7 are entered into delay elements 558 and 562, respectively. Also, bits 2 and 1 are transferred through OR 564 and AND gate 516 to delay element 526.

At the end of the seventh time interval when stage 514–3 is turned off by a sync pulse it produces an output signal which turns on stage 514–4 and turns off stage 512–1. Stage 512–1 then turns on stage 512–2. During the eighth bit interval bit 8 passes through AND 548, OR 564, and AND 518 and is entered into the first storage position of delay element 530.

At the end of 08 time the sync pulse resets stage 514–4 and turns on 514–1.

During time intervals 9, 10 and 11, bits 7, 6 and 5 emerge from delay element 562, pass through OR 564, AND 518, OR 528 and are stored in delay element 530.

At the same time, bits 9, 10 and 11 are entered into delay elements 554, 558 and 562.

At the end of time 11, stage 514–3 is again reset to turn on 514–4 and advance counter 512. This turns on stage 3 of counter 512. Therefore, during time 12 bit 12 passes through OR 564, AND 520 and OR 532, and is stored in delay element 534. During times 13, 14 and 15 bits 11, 10 and 9 emerge from delay element 562 and are stored in delay element 534. Incoming bits 13, 14 and 15 are entered into delay elements 554, 558 and 562 since 514 advances one stage each bit interval.

At the end of time 15 stage 514–3 advances counter 512 to stage 4 so that bits 16, 15, 14 and 13 emerging from OR 564 are entered into delay element 538 during times 16 through 19. During time intervals 17, 18 and 19 bits 17, 18 and 19 are being entered into delay elements 554, 558 and 562.

At the end of time 19, stage 514–3 again advances counter 512 thus turning on stage 5. During time 20 bit 20 emerges from OR 564, passes through AND 524 and OR 540 to the output line 574. During times 21, 22 and 23, bits 19, 18 and 17 follow the same path and appear on output lead 574. Beginning at time 21 the first bit of a second block of bits may be entered by way of lead 510 and AND 542 into delay element 554. During times 22, 23 and 24 bits 2, 3 and 4 of the second block are entered into delay elements 558, 562 and 526.

At the end of time 23 stage 514–3 goes off thus turning on stage 514–4 and 512–1. It will be noted that this is also the condition of the counters at the end of time 03 so the sequence of operations from this point on is the same for block 2 as it was for block 1. At the end of time 23 bits 1 through 16 of block 1 are stored in delay elements 534 and 538. These bits move one storage position to the right each bit interval and appear one at a time on lead 574 with bit 16 appearing at time 24 and bit 1 appearing at time 39.

By time 39 the bits of block 2 have been reversed and the last bit (before reversal) of block 2 appears on lead 574 during time 40.

Thus, the apparatus of FIGURE 5 accomplishes the reversal of blocks of five groups of four bits each in thirty-nine intervals. For the general case the reversal of MN bits takes $2MN-1$ bit intervals. However, since the reversal of succeeding blocks may be accomplished during the time a preceding block is being read out the time required for reversing a sequence of JMN bits is $(J+1)MN-1$ bit intervals where J is the number of blocks, M is the number of groups in each block, and N is the number of bits in each group. Subtracting from this the normal amount of time it takes JMN bits to pass a given point in a circuit, the additional delay introduced by the reversal apparatus of FIGURE 5 is only $(J+1)MN-1-JMN=MN-1$ bit intervals regardless of the number of blocks in the sequence.

For the general case where each block contains MN bits the apparatus required to reverse first the bits and then the groups comprises $M+N$ counter stages, $M+N$ AND gates, $M+N-2$ OR circuits and $2MN-2$ delay elements. The delay elements may be any of the static or dynamic delay lines now known in the art. A comparison with FIGURE 2 shows that the number of circuit elements required is the same whether bits are reversed first or blocks are reversed first.

It should be obvious to those skilled in the art that "pure" or "non-reversing" delay elements may be provided between OR 564 and the AND gates of the block reversal apparatus. For example, a 1-bit delay element may be provided on the output of OR 564. In this case the output of counter stage 514–4 should provide the advance pulses for counter 512.

Figure 7:
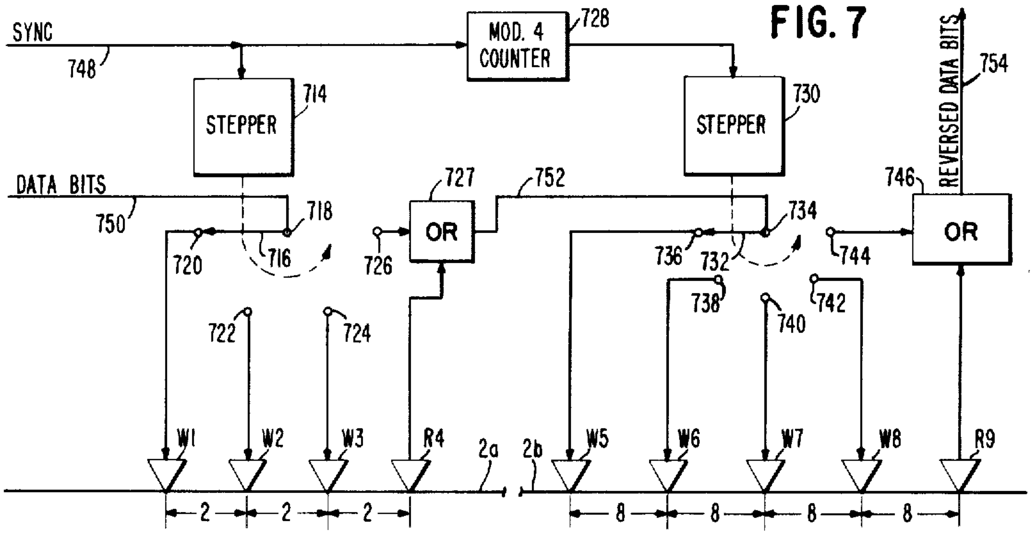
FIGURE 7 shows an apparatus similar to that of FIGURE 5 and adapted to utilize the surface of a rotating magnetic drum as the delay element.

FIGURE 7 shows a magnetic drum apparatus for reversing the sequence of bits in blocks each containing twenty bits by first subjecting each bit to a delay of $2(N-n)$ bit intervals to reverse the order of bits in each group and then subjecting each group of bits to a delay of $2N(M-m)$ bit intervals to reverse the order of the groups. It shows a specific embodiment of the apparatus of FIGURE 5 where $M=5$ and $N=4$ so the timing chart of FIGURE 6 illustrates its operation.

The bit reversal apparatus includes a modulo-4 counter or stepper switch 714 for stepping a contact arm 716 so that it selectively connects a common terminal 718 to a plurality of terminals 720, 722, 724 and 726. These latter terminals are connected to write heads W1, W2, W3 and an OR circuit 727, respectively.

The group reversal apparatus includes a modulo-4 counter 728, a modulo-5 counter or stepper switch 730 for stepping a contact arm 732 so that it selectively connects a common terminal 734 to a plurality of terminals 736, 738, 740, 742 and 744, a plurality of write heads W5, W6, W7 and W8 connected to terminals 736, 738, 740 and 742, respectively, and an OR circuit 746 connected to terminal 744. Sync pulses are applied to lead 748 during each bit interval. These pulses advance stepper switch 714 and counter 728 at the end of each bit interval. After every fourth bit interval counter 728 produces an end carry signal to advance stepper switch 730 one position.

Conventional reset means (not shown) may be provided to reset the device so that contact arm 716 makes contact with terminal 720, contact arm 732 makes contact with terminal 744, and the modulo-4 counter 728 contains a count of 1. With this arrangement counter 728 produces an output signal to advance stepper 730 at the end of time intervals 03, 07, 11, 15 and 19.

Data bits 1, 2 and 3 and succeeding fourth data bits appearing on lead 750 are recorded on drum surface 2*a* by one of the heads W1 through W3. These heads are spaced to provide a 2-bit delay between the time a point on the drum surface passes between one head and the next.

Bits 1, 5, 9, 13 and 17 are recorded by head W1 during times 1, 5, 9, 13 and 17, respectively. Bits 2, 6, 10, 14 and 18 are recorded by head W2 during times 2, 6, 10, 14 and 18, and bits 3, 7, 11, 15 and 19 are recorded by head W3 time intervals 3, 7, 11, 15 and 19.

Data bits 4, 8, 12, 16 and 20 appearing on lead 750 pass through OR circuit 727 to the block reversal mechanism. Bits 4, 8, 12 and 16 are recorded on drum surface 2*b* by heads W5, W6, W7 and W8, respectively. Bit 16 passes through OR 727 and OR 746 to the output lead and is never recorded on the drum surface.

The mode of operation of FIGURE 7 is essentially the same as that of FIGURE 4 hence a detailed description is believed unnecessary. Basically, the first data bit of each group is recorded by head W1, the second data bit by head W2, and the third data bit by head W3. The fourth data bit of each group except the last is applied to OR 727 and recorded by one of the heads W5 through W8. The fourth data bit of the last group passes through OR 727 and OR 746 to the output.

The bits recorded by heads W1, W2 and W3 are read by read/erase head R4 after a given delay. The output from R4 is applied to OR 727 hence the first bit recorded by each of the heads W1, W2, and W3 is read by R4 and then rerecorded by head W5, the second bit recorded by each of the heads W1, W2, W3 is read by R4 and rerecorded by W6, the third bit read by R4 and rerecorded by W7 and the fourth bit read by R4 and rerecorded by W8. The fifth bit recorded by each of the heads W1, W2, W3 is read by R4 which produces signals that pass through OR 746 to the output line.

The bits recorded by heads W5, W6, W7 and W8 are read by R9 which produces a signal that passes through OR 746 to the output line.

The embodiments described above all accomplish the reversal of the block of data bits by reversing on a group and a bit basis. The embodiment of FIGURE 8*a* illustrates that the principles of the present invention are equally suitable in a multiple factor arrangement wherein each block of digits is divided into groups, sub-groups, and sub-subgroups of bits. Specifically, this embodiment is adapted to reverse a block of sixteen bits by reversing the order of the pair of bits in each sub-subgroup, reversing the order of the pair of sub-subgroups in each subgroup, reversing the order of the pairs of sub-groups in each group, and reversing the order of the pair of groups in each block.

As an illustration consider the sequence 1 2 3 4 5 6 7 8 9 10 11 12 13 14 15 16

Reversing the order of occurrence of the pairs of bits in each sub-subgroup results in the sequence 2 1, 4 3, 6 5, 8 7, 10 9, 12 11, 14 13, 16 15. Reversing the order of occurrence of the pair of sub-subgroups in each sub-group results in the sequence 4 3 2 1, 8 7 6 5, 12 11 10 9, 16 15 14 13. Reversing the order of occurrence of the pair of sub-groups in each group results in the sequence 8 7 6 5 4 3 2 1, 16 15 14 13 12 11 10 9. Reversing the order of the two groups in the block gives the sequence 16 15 14 13 12 11 10 9 8 7 6 5 4 3 2 1. This sequence is the reverse of the original sequence and illustrates the basic principle of the apparatus. However, the embodiment of FIGURE 8*a* actually accomplishes reversal of some bit pairs, sub-subgroups, etc. during concurrent time intervals as illustrated in FIGURE 9.

The embodiment shown in FIGURE 8*a* illustrates still another feature. A foldback or end around feedback is provided to reduce the number of delay elements required for reversing a block of data bits.

The multiple factor arrangement comprises an OR circuit 800, a two-bit delay element 802, an OR circuit 804, a one-bit delay element 806, a four-bit delay element 808, an OR circuit 810, a one-bit delay element 812, an eight-bit delay element 814, an OR circuit 816, a one-bit delay element 818, and an eight-bit delay element 820 all serially connected in the order listed to provide a twenty-five bit delay line. The output from delay element 820 is fed back by way of lead 822 to the OR circuit 800.

Data bits appear serially on input lead 824 and are applied in parallel to a pair of AND gates 826 and 828. The outputs of these gates are connected to OR circuits 800 and 804, respectively.

A sync or clock pulse appears on lead 830 during each bit interval to advance a modulo-34 counter 832. During each odd numbered bit interval the counter produces a gate pulse on lead 834 to condition AND 826 and during each even numbered bit interval it produces a pulse on lead 836 to condition AND 828. Thus on odd bit intervals a data bit on lead 824 passes through AND 826 and OR 800 and is stored in 802, and on even bit intervals a signal on lead 824 passes through AND 828 and OR 804 and is stored in 806.

The output of delay element 806 is applied to delay element 808 and an AND gate 838. The output of 838 is connected to OR 810 to thus provide a bypass circuit around delay element 808. Counter 832 produces gating pulses on lead 840 during bit intervals 5, 6, 9, 10, 13 and 14. These pulses are applied to AND 838 to condition the bypass circuit around delay element 808 and are also applied to the delay element 808 to prevent bits of information from being entered therein during these intervals.

The output of delay element 812 is connected to delay element 814 and AND gates 842 and 844. AND 842 is connected to OR 816 to thus provide a bypass around delay element 814. Counter 832 produces gating pulses on lead 846 during bit intervals 10 through 13 and 18 through 21 to condition AND 842 and enable the bypass circuit. The gating pulses on lead 846 are also applied to delay element 814 to prevent data bits from being entered into the element during these bits intervals.

AND 848 is connected to the output of delay element

818. As shown subsequently, bits 16 through 9 appear at the output of delay element 818 during time intervals 19 through 16. The AND gate is conditioned during this time by signals from counter 832 so the bits pass through the gate and OR circuit 850 to the output line 852. The counter pulses 19 through 26 are also applied to delay element 820 to prevent bits 16 through 9 from being entered therein.

Bits 8 through 1 of the block appear at gate 844 during times 27 through 34 and counter pulses appearing on lead 856 condition the gate so that these bits pass through OR 850 to the output line immediately after bits 16 through 9.

The timing diagram of FIGURE 9 illustrates the operation of the apparatus shown in FIGURE 8*a* and FIGURE 8*b*. At the top of the timing chart the relative distance between W1 and W2, W2 and R3, R3 and W3, W3 and R4, R4 and W4, W4 and R5 and R5 and R6 represent the delays introduced by delay elements 802, 806, 808, 812, 814, 818, and 820, respectively. That portion of the diagram to the right of R6 and the line 900 relates to a modification subsequently described. The storage location of each data bit at the end of a given time period may be determined by reading the horizontal line opposite the given time period.

During time 01 data bit 1 appears on lead 824, passes through AND 826 and OR 800 and is stored in the first storage position of delay element 802. During time 02 the second data bit appears on lead 824 and passes through AND 828 and OR 804 and is stored in delay element 806. In the meantime, bit 1 moves from the first to the second storage position of delay element 802.

During times 03 and 04 bits 3 and 4 are stored in delay elements 802 and 808, respectively. During these times bits 2 and 1 are read out of delay element 806 and are entered into delay element 808.

During time 05 bit 05 is stored in delay element 802. Bit 3 is advanced and stored in delay element 806. Bit 4 is read out of delay element 806 and since a signal appears on lead 840 it passes through AND 838 and OR 810 and is entered into delay element 812. The signal on lead 840 also prevents bit 4 from being entered into delay 808.

During time 06 bit 6 is stored in delay element 806. Bit 3 is read out of delay element 806 and passes through AND 838 and OR 810 and is entered into delay element 812. Bit 4 is read out of delay element 812 and enters the first storage position of delay element 814.

During time 7 bit 7 is entered into delay element 802. Bit 5 is transferred from 802 to 806. Bit 6 is transferred from 806 to 808 since there is no pulse on lead 840 at this time. Bit 3 is read out of 812 and entered into 814.

During time 08 bit 8 is stored in delay element 806. Bit 7 advances from the first to the second storage position in 802. Bit 5 advances from 806 to the first storage position in 808. Bit 2 advances from 812 to the first storage position in 814. Bit 1 advances from 808 to 812.

During time 09 bit 9 is entered into delay element 802, bit 7 moves from 802 to 806, bits 5 and 6 are advanced in delay element 808, bit 8 moves from 806 to 812 by way of the AND gate 838, bit 1 moves from 812 to 814, and bits 2, 3 and 4 are advanced along delay element 814.

During time 10 bit 10 is entered into delay element 806, bit 9 advances along delay element 802, bits 5 and 6 advance along delay element 808, bit 7 moves from 806 to 812 by way of AND gate 838, bits 1, 2, 3 and 4 advance along the delay element 814, and bit 8 moves from 812 to 818 by way of the AND gate 842.

The sequence of events from time 10 until time 16 is believed obvious from the timing diagram. During time 16 bit 16 appears on lead 824 and is entered into delay element 806. During time 17 bit 16 is read out of 806 and passes by way of AND 838 and is entered into delay element 812. During time 18 bit 16 is read out of 812 and passes by way of AND 842 and is stored in delay element 818. During time 19 bit 16 is read out of delay element 818 and since AND 848 is conditioned at this time bit 16 passes through AND 848 and OR 850 to appear on the output lead.

During times 20, 21 and 22 bits 15, 14 and 13 are read out of delay element 818 having been entered therein from delay element 812. During times 23, 24, 25 and 26 bits 12, 11, 10 and 9 are read out of delay element 818 to the output line these bits having been entered into 818 from delay element 814. Thus, bits 16 through 9 appear on the output lead 852 during times 19 through 26.

As explained previously, bit 8 was entered into delay element 818 during time 10. During times 11 through 26 it progresses through delay elements 820, 802, 806, 808 and 812. Bits 7 through 1 follow it through the same path in sequence. Therefore, during times 27 through 34 bits 8 through 1 are applied to AND gate 844 and since this gate is conditioned during these intervals by pulses from the counter bits 8 through 1 appear on the output lead 852.

The timing pulses appearing on leads 854 and 856 during time intervals 19 through 26 and 27 through 34, respectively, block the inputs of delay elements 820 and 814 to erase the bit signals from the system. If this were not done the pattern of signals for the first block of data bits would be superimposed upon the pattern of the second block when the second block is applied to lead 824 beginning at time 1 of the next cycle.

The apparatus just described requires thirty-four bit intervals to reverse and read out a block of sixteen bits. Furthermore, because of the timing pulses applied to AND gates 838, 842, 844 and 848 the second block of data bits cannot be applied to the apparatus until the first block has been completely read out. Thus it takes thirty-four bit intervals to reverse each block of bits in a sequence. For the general case where there is a sequence of J blocks it requires $J(2MPQ+2)$ pulse periods to reverse and read out the sequence. This time is considerably greater than that required for the embodiments previously described. However, a saving is accomplished in the number of delay positions required for the apparatus. For reversing blocks of sixteen bits each twenty-five delay elements are required. For the general case where each block contains MPQ digits the number of elements of delay required is $3/2(MPQ)+1$ where M is the number of groups in a block, P is the number of sub-groups in a group, and Q is the number of bits in each sub-group.

The multifactor arrangement is not limited to those species wherein foldback of the delay elements is utilized. For example, FIGURE 8*a* may be modified as shown in FIGURE 8*b* to provide a multiple factor reversing apparatus wherein there is no feedback from the last delay element to the first. As shown in FIGURE 8*b* the delay element 820 connected to the output of delay element 818 is replaced by a 16-bit delay element 860. The output of delay element 860 is connected through an OR circuit 862 to the output line 864. The reversed data bits appear on the output line 864. To provide a bypass circuit around 860 the output of 818 is applied to an AND gate 866 which in turn has its output connected to the OR circuit 862. AND circuit 866 is conditioned during times 19 through 26 by counter pulses appearing on lead 868. These pulses are also applied to the sixteen-bit delay element 860 to inhibit read-in of this element while the bypass circuit is in operation. The modifications shown in FIGURE 8*b* eliminate the need for AND circuits 844 and 848 and OR circuit 850 shown in FIGURE 8*a*. Also, the inhibit signals applied to 814 over lead 856 during times 27 through 34 are not required. The modulo-34 counter is replaced with a modulo-16 counter 870 which applies odd pulses to AND 826 and even pulses to AND 828, and applies pulses to AND 838 at times 1, 2, 5, 6, 9, 10, 13 and 14, AND 842 at times 2 through 5 and 10 through 13 and AND 868 at times 3 through 10 of the counter cycle over the leads 834, 836, 840 and 846.

Referring now to FIGURE 9 the distance between R5 and R7 corresponds to the sixteen storage positions of delay element 860. As shown in FIGURE 9 bits 16 through 1 successively appear on output line 864 during times 19 through 34.

An inspection of FIGURE 9 shows that an individual data bit is subjected to delays of $$2(Q-q)+1,\ 2Q(P-p)+1 \text{ and } 2QP(M-m)+1$$

by the embodiment of FIGURE 8*b* where *q* represents the relative order of occurrence of the bit in its sub-group, *p* represents the relative order of occurrence of a sub-group within its group, and *m* represents the relative order of occurrence of a group within the block. For example, consider the first bit in the first sub-group in the first group of a block of sixteen bits where $Q=4$, $P=2$ and $M=2$. The total delay encountered by the bit as it passes through the apparatus of FIGURE 8*b* is $$[2(4-1)+1]+[2\cdot4(2-1)+1]+[2\cdot4\cdot2(2-1)+1]=33 \text{ bit intervals}$$

Thus, the first bit of a block passes through each of the delay elements 802, 806, 808, 812, 814, 818, 860 and 864. The delay of $2(Q-q)+1$ is provided by elements 802, 806 and 808. The delay of $2Q(P-p)+1$ is provided by elements 812 and 814. Finally, the delay of $2QP(M-m)$ is provided by elements 818 and 860.

As a second example consider the last bit of a block of sixteen bits. It is subjected to a delay of $$[2(4-4)+1]+2\cdot4(2-2)+1]+[2\cdot4\cdot2(2-2)+1]=3 \text{ bit intervals}$$

These delays are provided by delay elements 806, 812 and 818, respectively.

It will be obvious that additional circuitry may be added to reverse the order of occurrence of the blocks in a sequence to thus obtain a reversal of the bits within the whole sequence. Thus, if it is desired to reverse a sequence of J blocks, the apparatus of FIGURE 8*b* may be modified by the addition of J delay elements each having a delay of MPQ bit intervals and a fourth delay element having a delay of one bit, the delays being connected in series to provide a maximum delay of $JMPQ+1$ bit intervals. The output of FIGURE 8*b* is then selectively applied to the additional circuitry so that each block is delayed $2PQM(J-j)+1$ bit intervals where *j* is the relative order of occurrence of a given block of signals in the sequence. Furthermore, the order of occurrence of sequences within a larger unit such as a message may be accomplished by adding still more delay units.

The embodiment of FIGURE 8*b* requires thirty-four bit intervals to reverse and read out one block of sixteen bits. For the general case where each block contains MPQ bits the time required to reverse one block is $2MPQ+2$ bit intervals. However, since there is no feedback from the last to the first delay element in this embodiment the second block of bits may be applied to the apparatus beginning at time 17. An extension of the timing chart of FIGURE 9 will show that bit 16 of the second block becomes available on the output line 864 during time thirty-five which is the bit interval immediately following the time in which the last bit of the first block appears on the output line. Because subsequent blocks may be reversed while a preceding block is being read out, the total time required by the embodiment of FIGURE 8*b* to reverse and read out a sequence of J blocks each containing MPQ digits is $(J+1)MPQ+2$ bit intervals. Thus, the total delay encountered as a result of the reversing operation remains constant at $MPQ+2$.

While various embodiments of the present invention have been shown and described, various substitutions and modifications will become apparent. For example, by providing a plurality of selectively connectible delays it is possible to handle blocks of various sizes more efficiently. By providing time spaces forming interblock spacings and providing "non-reversing" or pure data delay elements, further manipulation is made possible. It is intended therefore to be limited only by the scope of the appended claims.

I claim:

1. A device for reversing the order of occurrence of an incoming block of data bits, said block comprising M groups each containing N bits, where $M\times N$ is greater than M or N, said reversing device comprising: group reversal means responsive to said incoming block of data bits for producing an intermediate block of data bits wherein the groups thereof are reversed; and bit reversal means responsive to said intermediate block of data bits for reversing the order of occurrence of the bits in each group in said intermediate block whereby the data bits appear at the output of said bit reversal means in the reverse order from that in which they appear in said incoming block.

2. A device for reversing an incoming block of MN data bits occurring serially in time during MN bit intervals where M is the number of groups of bits in said block, N is the number of bits in each of said groups, and $M\times N$ is greater than M or N, said reversing device comprising: group reversal means having an input for receiving said incoming block and an output for producing an intermediate block of data bits in which the groups thereof appear in the reverse order from that in which they occurred in said incoming block; and bit reversal means responsive to said intermediate block of data bits for producing an output block of data bits in which the bits thereof are produced in the reverse order from that in which they occurred in said incoming block.

3. A device for reversing an incoming block of MN data bits occurring serially in time during MN bit intervals where M is the number of groups of bits in said block and N is the number of bits in each of said groups, said reversing device comprising: group reversal means having an input for receiving said incoming block and an output for producing an intermediate block of data bits in which the groups thereof appear in the reverse order from that in which they occurred in said incoming block; and bit reversal means responsive to said intermediate block of data bits for producing an output block of data bits in which the bits thereof are produced in the reverse order from that in which they occurred in said incoming block, said group reversal means further comprising $M-1$ delay elements each having a delay of 2N bit intervals and serially connected to form a delay means having $2N(M-1)$ bit intervals of delay, and gating means for applying successive groups of said incoming block of bits to succeeding ones of said $M-1$ delay elements and the output of said group reversal means whereby the groups of said block are delayed $2N(M-m)$ bit intervals, *m* being a number representing the relative order of occurrence of a given group in said incoming block.

4. A device as claimed in claim 3 wherein said bit reversal means comprises $N-1$ delay elements each having a delay of two bit intervals and serially connected to form a delay means having $2(N-1)$ bit intervals of delay, and second gating means for applying successive bits in each group of said intermediate block of data bits to succeeding ones of said $N-1$ delay elements and the output of said bit reversal means whereby the bits of said groups of said intermediate block are delayed $2(N-n)$ bit intervals, *n* being a number representing the relative order of occurrence of a given bit in a group in said intermediate block.

5. A device as claimed in claim 4 wherein said second gating means comprises N AND gates connected to the output of said group reversal means, and a modulo-N counter connected to said AND gates and responsive to pulses occurring during each bit interval for successively conditioning said gates in sequence; said first gating means comprising M AND gates responsive to said incoming block, and a modulo-M counter connected to said M AND gates and responsive to end carry pulses from said modulo-N counter for successively conditioning said M AND gates in sequence.

6. A device for reversing an incoming block of MN data bits occurring serially in time during MN bit intervals where M is the number of groups of bits in said block and N is the number of bits in each of said groups, said reversing device comprising: group reversal means having an input for receiving said incoming block and an output for producing an intermediate block of data bits in which the groups thereof appear in the reverse order from that in which they occurred in said incoming block; and bit reversal means responsive to said intermediate block of data bits for producing an output block of data bits in which the bits thereof are produced in the reverse order from that in which they occurred in said incoming block, said group reversal means further comprising a movable magnetic recording track, $M-1$ recording heads spaced along said recording track whereby a point on said track requires 2N bit intervals to move from one of said recording heads to the next; a read head connected to said group reversal output and located adjacent said recording track to read signals recorded by said recording heads, said read head being located whereby a signal recorded by one of said recording heads is read by said read head at a multiple of 2N bit intervals later, and gating means for applying successive groups of said incoming block of bits to succeeding ones of said $M-1$ recording heads and the output of said group reversal means whereby the groups of said block are delayed $2N(M-m)$ bit intervals, $m$ being a number representing the relative order of occurrence of a given group in said incoming block.

7. A device as claimed in claim 6 wherein said bit reversal means comprises a magnetic recording track, $N-1$ recording heads spaced along said recording track whereby a point on said track requires two bit intervals to move from one of said recording heads to the next, a read head connected to said bit reversal output and located adjacent said recording track to read signals recorded by said recording heads, said recording head being located whereby a signal recorded by one of said recording heads is read by said read head at a multiple of two bit intervals later, and gating means for applying successive bits of said intermediate block of bits to succeeding ones of said $N-1$ recording heads and the output of said bit reversal means whereby the bits in each group of said intermediate block are delayed $2(N-n)$ bit intervals, $n$ being a number representing the relative order of occurrence of a given bit in a group of said intermediate block.

8. A device for reversing the order of occurrence of an incoming block of data bits, said block comprising M groups each containing N bits where the produce of $M \times N$ is greater than M or N, said reversing device comprising: bit reversal means responsive to said incoming block of data bits for producing an intermediate block of data bits wherein the order of bits within each group is reversed; and group reversal means responsive to said intermediate block of data bits for reversing the order of occurrence of the groups in said intermediate block whereby the data bits appear at the output of said bit reversal means in the reverse order from that in which they appear in said incoming block.

9. A device for reversing an incoming block of MN data bits occurring serially in time during MN bit intervals where M is the number of groups in said block, N is the number of bits in each of said groups, and the product of $M \times N$ is greater than M or N, said reversing device comprising: bit reversal means having an input for receiving said incoming block and an output for producing an intermediate block of data bits in which the bits in each group thereof appear in the reverse order from that in which they occurred in said incoming block; and group reversal means responsive to said intermediate block of data bits for producing an output block of data bits in which the groups thereof are produced in the reverse order from that in which they occurred in said intermediate block of data bits.

10. A device for reversing an incoming block of MN data bits occurring serially in time during MN bit intervals where M is the number of groups in said block and N is the number of bits in each of said groups, said reversing device comprising: bit reversal means having an input for receiving said incoming block and an output for producing an intermediate block of data bits in which the bits in each group thereof appear in the reverse order from that in which they occurred in said incoming block; and group reversal means responsive to said intermediate block of data bits for producing an output block of data bits in which the groups thereof are produced in the reverse order from that in which they occurred in said intermediate block of data bits, said group reversal means comprising $M-1$ delay elements each having a delay of 2N bit intervals and serially connected to form a delay means having $2N(M-1)$ bit intervals of delay, and gating means for applying successive groups of said intermediate block of bits to succeeding ones of said $M-1$ delay elements and the output of said group reversal means whereby the groups of said block are delayed $2N(M-m)$ bit intervals, $m$ being a number representing the relative order of occurrence of a given group in said intermediate block.

11. A device as claimed in claim 10 wherein said bit reversal means comprises $N-1$ delay elements each having a delay of two bit intervals and serially connected to form a delay means having $2(N-1)$ bit intervals of delay, and second gating means for applying successive bits in each group of said incoming block of data bits to succeeding ones of said $N-1$ delay elements and said bit reversal output whereby the bits of said groups of said incoming block are delayed $2(N-n)$ bit intervals, $n$ being a number representing the relative order of occurrence of a given bit in a group in said intermediate block.

12. A device as claimed in claim 10 wherein: said second gating means comprises N AND gates responsive to said incoming block of signals, and a modulo-N-counter connected to said AND gates and responsive to pulses occurring during each bit interval for successively conditioning said gates in sequence; and said first gating means comprises M AND gates responsive to said intermediate block of bits, and a modulo-M counter connected to said M AND gates and responsive to said modulo-N counter for successively conditioning said M AND gates in sequence.

13. A device for reversing an incoming block of MN data bits occurring serially in time during MN bit intervals where M is the number of groups in said block and N is the number of bits in each of said groups, said reversing device comprising: bit reversal means having an input for receiving said incoming block and an output for producing an intermediate block of data bits in which the bits in each group thereof appear in the reverse order from that in which they occurred in said incoming block; and group reversal means responsive to said intermediate block of data bits for producing an output block of data bits in which the groups thereof are produced in the reverse order from that in which they occurred in said intermediate block of data bits, said bit reversal means comprises a magnetic recording track, $N-1$ recording heads spaced along said recording track whereby a point on said track requires two bit intervals to move from one of said recording heads to the next, a read head connected to said bit reversal output and located adjacent said recording track to read signals recorded by said recording heads, said recording head being located whereby a bit recorded by one of said recording heads is read by said read head after a delay of $2(N-n)$ bit intervals, $n$ being a number representing the relative order of a given bit in a group in said incoming block, and gating means for applying successive bits of said incoming block to said $N-1$ recording heads.

14. A device as claimed in claim 13 wherein said group reversal means further comprises a movable magnetic recording track, $M-1$ recording heads spaced along said recording track whereby a point on said track requires 2N bit intervals to move from one of said recording heads to the next; a read head connected to said group reversal output and located adjacent said recording track to read signals recorded by said $M-1$ recording heads, said read head being located whereby a signal recorded by one of said recording heads is read by said read head at a multiple of 2N bit intervals later, and gating means for applying successive groups of said intermediate block of bits to succeeding ones of said $M-1$ recording heads and the output of said group reversal means whereby the groups of said intermediate block are delayed $2N(M-m)$ bit intervals, $m$ being a number representing the relative order of occurrence of a given group in said intermediate block.

15. A device for reversing the order of occurrence of bits in an incoming block of MPQ data bits where M is the number of groups of signals, P is the number of sub-groups of bits in each group, and Q is the number of individual bits in each sub-group, said device comprising: first delay means having $Q-1$ delay elements each having a delay of two bit intervals and a first delay element having a delay of one bit interval, said delay elements being connected in series to provide a maximum delay of $2Q-1$ bit intervals; second delay means having P delay elements each having a delay of Q bit intervals and a second delay element having a delay of one bit, said delay elements being connected in series to provide a maximum delay of $QP+1$ bit intervals; third delay means having M delay elements each having a delay of QP bit intervals and a third delay element having a delay of one bit interval, said delay elements being connected in series to provide a maximum delay of $QPM+1$ bit intervals; first gating means for selectively applying the data bits in each of said sub-groups of said incoming block to said first delay means to delay said bits for $2(Q-q)+1$ bit intervals where $q$ is a numeral representing the relative order of occurrence of a bit within its sub-group; second gating means for selectively applying the output bits from said first one bit delay element to said second delay means to delay sub-groups of said bits $2Q(P-p)$ bit intervals where $p$ is a numeral representing the relative order of occurrence of a sub-group within its group; third gating means for selectively applying the output bits from said second one bit delay element to said third delay means to delay groups of said bits $2PQ(M-m)$ bit intervals where $m$ is a numeral representing the relative order of occurrence of a group within said block; and readout means responsive to the bits occurring at the output of said third delay means for reading out said reversed block of data bits.

16. A device as claimed in claim 15 wherein said readout means includes fourth delay means connecting the output of said third delay means to said first delay means, means for reading groups of bits from said third delay means while inhibiting said fourth delay means, and means for reading groups of bits from said second delay means while inhibiting said third delay means.

17. A device as claimed in claim 15 adapted to reverse a sequence of J blocks of data bits each containing MPQ data bits, said readout means comprising fourth delay means having J delay elements each having a delay of MPQ bit intervals and a fourth delay element having a delay of one bit connected in series to provide a maximum delay of $JMPQ+1$ bit intervals; and fourth gating means for selectively applying the output blocks of said third delay means to said fourth delay means to selectively delay said blocks $2PQM(J-j)+1$ bit intervals where $j$ is the relative order of occurrence of a given block in said sequence, whereby the output of said fourth delay means is a sequence of data bits appearing in the reverse order from that in which they appeared in said incoming sequence.

18. A device for reversing an incoming block of MPQ data bits occurring serially in time during MPQ bit intervals where M is the number of groups of bits in said block, P is the number of sub-groups in each of said groups, and Q is the number of bits in each of said sub-groups, said device comprising: $M-1$ delay elements each having a delay of 2PQ bit intervals and serially connected to form a first delay means having $2PQ(M-1)$ bit intervals of delay; $P-1$ delay elements each having a delay of 2Q bit intervals and serially connected to form a second delay means having a delay of $2Q(P-1)$ bit intervals; $Q-1$ delay elements each having a delay of two bit intervals and serially connected to form a third delay means having a delay of $2(Q-1)$ bit intervals; first gating means for selectively applying successive groups of said incoming block to successive ones of said $M-1$ delay elements and the output of said first delay means; second gating means responsive to the output from said first delay means for selectively applying successive sub-groups in each of said groups to successive ones of said $P-1$ delay elements and the output of said second delay means; third gating means responsive to the output from said second delay means for selectively applying successive bits in each of said sub-groups to successive ones of said $Q-1$ delay elements and the output of said third delay means; and means for selectively conditioning said gating means whereby a given group of said incoming block is delayed $2PQ(M-m)$ bit intervals by said first delay means, $m$ being the relative order of occurrence of a given group in said incoming block, a given sub-group appearing at the output of said first delay means is delayed $2Q(P-p)$ bit intervals by said second delay means, $p$ being the relative order of occurrence of a given sub-group in its group in said incoming sequence, and a given bit appearing at the output of said second delay means is delayed $2(Q-q)$ bit intervals by said third delay means, $q$ being the relative order of occurrence of a given bit within its sub-group in said incoming sequence to produce said reversed block at the output of said third delay means.

References Cited by the Examiner

UNITED STATES PATENTS

| | | | |
|---|---|---|---|
| 2,876,437 | 3/1959 | Johnson | 340—172.5 |
| 2,983,904 | 5/1961 | Moore | 340—172.5 |
| 3,034,103 | 5/1962 | Underwood | 340—172.5 |

ROBERT C. BAILEY, *Primary Examiner.*

MALCOLM A. MORRISON, *Examiner.*

W. M. BECKER, *Assistant Examiner.*